US011728654B2

(12) United States Patent
Zhang et al.

(10) Patent No.: US 11,728,654 B2
(45) Date of Patent: Aug. 15, 2023

(54) SYSTEMS AND METHODS FOR OPERATING POWER GENERATING ASSETS

(71) Applicant: General Electric Renovables Espana, S.L., Barcelona (ES)

(72) Inventors: Zhanpan Zhang, Niskayuna, NY (US); Scott Charles Evans, Burnt Hills, NY (US); Peter Alan Gregg, Niskayuna, NY (US); Matthew David Pepple, Greenville, SC (US); Manuel Rodolfo Valdez, Las Vegas, NV (US); David William Eldridge, Ballston Spa, NY (US); Ricardo Zetina Benignos, Queretaro (MX); Andrew T. Ferree, Simpsonville, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 148 days.

(21) Appl. No.: 17/206,331

(22) Filed: Mar. 19, 2021

(65) Prior Publication Data

US 2022/0302705 A1 Sep. 22, 2022

(51) Int. Cl.
  G05B 13/02 (2006.01)
  G05B 13/04 (2006.01)
  H02J 3/38 (2006.01)

(52) U.S. Cl.
  CPC .......... H02J 3/381 (2013.01); G05B 13/0265 (2013.01); G05B 13/048 (2013.01);
  (Continued)

(58) Field of Classification Search
  CPC ............... G05B 13/0265; G05B 13/048; H02J 2203/20; H02J 2300/22; H02J 2300/28
  (Continued)

(56) References Cited

U.S. PATENT DOCUMENTS

| 2,837,984 A | 6/1958 | Klotz |
| 6,922,640 B2 | 7/2005 | Vezzu et al. |

(Continued)

FOREIGN PATENT DOCUMENTS

| CN | 101218401 A | 7/2008 |
| CN | 106097146 A | 11/2016 |

(Continued)

OTHER PUBLICATIONS

Barradas Berglind, Fatigue-Damage Estimation and Control for Wind Turbines, Department of Electronic Systems, Automation & Control, Ph.D. Thesis Aalborg University, 2015, 70 Pages. https://doi.org./10.5278/vbn.phd.engsci.00040.

(Continued)

*Primary Examiner* — Jigneshkumar C Patel
(74) *Attorney, Agent, or Firm* — Dority & Manning, P.A.

(57) ABSTRACT

A system and method are provided for operating a power generating asset. Accordingly, at least one external data set indicative of a plurality of variables affecting the performance of the power generating asset is received by the controller. The controller also receives at least one operational data set indicative of the performance of the power generating asset. A plurality of production-assessment models for the power generating asset are generated and trained based on the data sets. A performance prediction is then generated for each of a plurality of model-variable combinations and a control action is implemented based on one of the performance predictions.

17 Claims, 7 Drawing Sheets

(52) U.S. Cl.
CPC ....... *H02J 2203/20* (2020.01); *H02J 2300/22* (2020.01); *H02J 2300/28* (2020.01)

(58) Field of Classification Search
USPC .......................................................... 700/287
See application file for complete search history.

(56) References Cited

U.S. PATENT DOCUMENTS

| | | |
|---|---|---|
| 6,975,925 B1 | 12/2005 | Barnes et al. |
| 7,149,657 B2 | 12/2006 | Goebel et al. |
| 7,256,508 B2 | 8/2007 | Altemark et al. |
| 7,395,188 B1 | 7/2008 | Goebel et al. |
| 7,548,830 B2 | 6/2009 | Goebel et al. |
| 7,725,293 B2 | 5/2010 | Bonissone et al. |
| 7,889,840 B2 | 2/2011 | Vasudevan et al. |
| 7,895,016 B2 | 2/2011 | Vittal et al. |
| 8,108,080 B2 | 1/2012 | Wakata et al. |
| 8,249,852 B2 | 8/2012 | Thulke |
| 8,451,134 B2 | 5/2013 | Bharadwaj et al. |
| 8,554,386 B2 | 10/2013 | Rutman |
| 8,649,911 B2 | 2/2014 | Avagliano et al. |
| 8,694,268 B2 | 4/2014 | Karikomi et al. |
| 8,928,164 B2 | 1/2015 | Bowyer et al. |
| 8,930,299 B2 | 1/2015 | Pyle et al. |
| 9,018,782 B2 | 4/2015 | Couchman et al. |
| 9,035,479 B1 | 5/2015 | Gates |
| 9,074,468 B1 | 7/2015 | Selman et al. |
| 9,097,236 B2 | 8/2015 | Zhou et al. |
| 9,194,376 B2 | 11/2015 | Ritter et al. |
| 9,395,270 B2 | 7/2016 | Czerniak et al. |
| 9,599,096 B2 | 3/2017 | Spruce et al. |
| 9,644,609 B2 | 5/2017 | Turner et al. |
| 9,797,328 B2 | 10/2017 | Martinez et al. |
| 9,816,483 B2 | 11/2017 | Nakamura et al. |
| 9,859,787 B2 | 1/2018 | Wagoner et al. |
| 9,874,107 B2 | 1/2018 | Falb et al. |
| 9,897,516 B2 | 2/2018 | Bechhoefer et al. |
| 10,181,101 B2 | 1/2019 | Zhang et al. |
| 10,288,038 B2 | 5/2019 | Badrinath Krishna et al. |
| 10,288,043 B2 | 5/2019 | Yu et al. |
| 10,436,178 B2 | 10/2019 | Hales et al. |
| 2004/0260512 A1 | 12/2004 | Olsson |
| 2005/0005186 A1 | 1/2005 | Goebel et al. |
| 2006/0228214 A1 | 10/2006 | Mabe et al. |
| 2008/0140361 A1 | 6/2008 | Bonissone et al. |
| 2011/0020122 A1 | 1/2011 | Parthasarathy et al. |
| 2011/0224926 A1* | 9/2011 | Morjaria ................. F03D 7/046 |
| | | 702/60 |
| 2012/0065901 A1 | 3/2012 | Bechhoefer et al. |
| 2012/0286509 A1 | 11/2012 | Rafoth |
| 2013/0035798 A1 | 2/2013 | Zhou et al. |
| 2013/0073223 A1 | 3/2013 | Lapira et al. |
| 2013/0257051 A1 | 10/2013 | Spruce et al. |
| 2013/0270827 A1 | 10/2013 | Couchman et al. |
| 2013/0320674 A1 | 12/2013 | Ingram |
| 2014/0248123 A1 | 9/2014 | Turner et al. |
| 2014/0288855 A1 | 9/2014 | Deshpande |
| 2014/0324495 A1 | 10/2014 | Zhou et al. |
| 2015/0003983 A1 | 1/2015 | Coultate |
| 2015/0176569 A1 | 6/2015 | Karikomi et al. |
| 2015/0278405 A1* | 10/2015 | Andersen ............... G06Q 10/04 |
| | | 703/18 |
| 2015/0308416 A1* | 10/2015 | Ambekar ................ F03D 17/00 |
| | | 700/287 |
| 2015/0381443 A1 | 12/2015 | Du Plessis |
| 2016/0223600 A1* | 8/2016 | Wang ..................... G01R 21/133 |
| 2016/0371405 A1 | 12/2016 | Raczynski et al. |
| 2017/0096983 A1 | 4/2017 | Hales et al. |
| 2017/0241405 A1 | 8/2017 | Kruger et al. |
| 2017/0337644 A1* | 11/2017 | Iyengar .................. G06Q 50/06 |
| 2018/0142674 A1 | 5/2018 | Hammerum et al. |
| 2018/0156197 A1 | 6/2018 | Spruce |
| 2018/0171979 A1 | 6/2018 | Spruce |
| 2018/0173214 A1 | 6/2018 | Higgins et al. |
| 2018/0173215 A1 | 6/2018 | Spruce et al. |
| 2018/0180024 A1 | 6/2018 | Spruce |
| 2018/0180025 A1 | 6/2018 | Spruce et al. |
| 2018/0180026 A1 | 6/2018 | Spruce et al. |
| 2018/0187648 A1 | 7/2018 | Spruce et al. |
| 2018/0187649 A1 | 7/2018 | Spruce et al. |
| 2018/0187650 A1 | 7/2018 | Byreddy et al. |
| 2018/0204095 A1 | 7/2018 | Chillar et al. |
| 2018/0223808 A1 | 8/2018 | Spruce |
| 2019/0203696 A1 | 7/2019 | Kaucic et al. |
| 2020/0347824 A1 | 11/2020 | Yu et al. |
| 2021/0061673 A1 | 3/2021 | Bishop |

FOREIGN PATENT DOCUMENTS

| | | |
|---|---|---|
| CN | 110059872 A | 7/2019 |
| EP | 2053241 A1 | 4/2009 |
| EP | 2578874 A1 | 4/2013 |
| EP | 2688015 A1 | 1/2014 |
| EP | 2457320 B1 | 4/2014 |
| EP | 2837984 B1 | 5/2019 |
| EP | 2956831 B1 | 8/2019 |
| WO | WO2017000955 A1 | 1/2017 |
| WO | WO2017000958 A1 | 1/2017 |
| WO | WO2017000959 A1 | 1/2017 |
| WO | WO2017000963 A1 | 1/2017 |
| WO | WO2017000964 A1 | 1/2017 |
| WO | WO2017205221 A1 | 11/2017 |
| WO | WO2019/148775 A1 | 8/2019 |
| WO | WO2020/200421 A1 | 10/2020 |

OTHER PUBLICATIONS

Spruce, Simulation and Control of Windfarms, University of Oxford, Department of Engineering Science, Ph.D. Thesis, 1993, 241 Pages. https://ora.ox.ac.uk/objects/unid:24f51a31-e2f9-422f-9837-3c28cfe12ccc.

European Search Report for EP application No. 22156562.5, dated Jul. 15, 2022.

Zhang, Jinhua et al., Short-term forecasting and uncertainty analysis of wind turbine power based on long short-term memory network and Gausssian mixture model, Applied Energy, vol. 241, Mar. 12, 2019, pp. 229-244.

\* cited by examiner

SYSTEMS AND METHODS FOR OPERATING POWER GENERATING ASSETS

FIELD

The present disclosure relates in general to power generating assets, and more particularly to systems and methods for operating power generating assets by generating performance predictions based on various model-variable combinations.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

It is often desirable to forecast the expected power production for the power generating asset. For example, the forecast may serve as a foundation for a production guarantee agreement. Typically, such a forecast may be accomplished using conventional means that consider a linear relationship between a variable (e.g. wind speed) and the energy production of the power generating asset. The variable is often retrospectively modeled at a monthly scale. This conventional method may lead to large variations in production estimation, especially when the sample size is small. Accordingly, it may be desirable to generate more accurate forecasts of the performance of the power generating asset.

In view of the aforementioned, the art is continuously seeking new and improved systems and methods for operating a power generating asset based on performance predictions for the power generating asset.

BRIEF DESCRIPTION

Aspects and advantages of the invention will be set forth in part in the following description, or may be obvious from the description, or may be learned through practice of the invention.

In one aspect, the present disclosure is directed to a method for operating a power generating asset. The method may include steps a) through f). As such, the method may include receiving, via a controller, at least one external data set for a sampling period from at least one source separate from the power generating asset. The external data set(s) may be indicative of a plurality of variables affecting a performance of the power generating asset. The method may also include receiving, via the controller, at least one operational data set for the power generating asset for the sampling period. The operational data set(s) may be indicative of the performance of the power generating asset. The controller may also generate a plurality of production-assessment models for the power generating asset. The production-assessment models may be trained via the external data set(s) and the operational data set(s) to correlate the performance of the power generating asset as a function of the plurality of variables. Additionally, the method may include generating, via the controller, a performance prediction over a predictive implementation period for each of a plurality of model-variable combinations. The model-variable combinations may include a plurality of combinations of each of the production-assessment models and the plurality of variables. Accordingly, the performance predictions may each include a power generation prediction and a confidence interval thereof. Further, based on one of the performance predictions, the controller may implement a control action.

In an embodiment, the plurality of variables may include, at least, data indicative of wind speed and wind direction at sampling intervals of the sampling period.

In an additional embodiment, the plurality of variables may also include data indicative of at least one of a temporal correlation, temperature, barometric pressure, air density, wind shear, wind veer, and turbulence intensity.

In a further embodiment, generating the plurality of production-assessment models may also include generating, for each of the plurality of production-assessment models, a statistical algorithm or machine learning algorithm configured to determine an optimal transfer function between at least two variables of the plurality of variables and the performance of the power generating asset.

In yet a further embodiment, the external data set(s) and the operational data set(s) may each be generated at a first sampling interval and a second sampling interval. As such, generating the plurality of production-assessment models may also include generating a first portion of the plurality of production-assessment models based on the external data set(s) and the operational data set(s) having the first sampling interval. Additionally, a second portion of the plurality of production-assessment models may be generated based on the external data set(s) and the operational data set(s) having the second sampling interval. The second sampling interval may have a higher frequency relative to the first sampling interval.

In an embodiment, the external data set(s) may include a modeled environmental data set indicative of a plurality of environmental variables affecting the power generating asset.

In an additional embodiment, the external data set(s) may include an environmental data set assembled from a group of power generating subsystems. Accordingly, the method may include receiving, via the controller, an indication of each of the plurality of variables from each of the power generating subsystems in the group at each sampling interval of the sampling period. The controller may then combine the plurality of variables received from each of the plurality of power generating subsystems in the group so as to generate a consensus environmental data set indicative of a plurality of consensus environmental variables affecting the performance of the power generating asset.

In a further embodiment, the external data set(s) may include a plurality of environmental measurements collected by a meteorological mast.

In yet a further embodiment, training the plurality of production-assessment models may also include training the plurality of production-assessment models via a plurality of environmental variables obtained via environmental sensor of the power generating asset.

In an embodiment, at least one of the external data set(s) and the operational data set(s) may also include at least one anomalous input for a sampling interval of the sampling period. Accordingly, the controller may generate, via an imputation algorithm, and imputed value for the anomalous input for the sampling interval.

In an additional embodiment, the power generating asset may include a wind turbine.

In a further embodiment, the power generating asset may include a plurality of power generating subsystems.

In yet a further embodiment, the power generating asset may include a wind farm, a solar power generation facility, and/or a hybrid power generating facility.

In an embodiment, the power generating asset may be one of a plurality of power generating assets. In such an embodiment, the steps a) through e) may be repeated for each of the plurality of power generating assets. Additionally, the controller may establish a rank order for each of the plurality of power generating assets according to a desired performance prediction characteristic. The implementation of the control action may be based on the rank order.

In an additional embodiment, implementing the control action may include upgrading at least one of the plurality of power generating assets. Accordingly, an upgrade threshold may be established which corresponds to a percentage increase of the performance prediction relative to the performance of the power generating asset as indicated by the operational data set. The percentage increase may be attributable to a prospective upgrade of the power generating asset. As such, the control action may include upgrading the power generating capacity of the power generating asset(s) having a percentage increase of the performance prediction which is greater than the upgrade threshold.

In a further embodiment, implementing the control action may include implementing a diagnostic process on at least one of the plurality of power generating assets. Accordingly, a diagnostic threshold may be established which may be indicative of a percentage shortfall of the performance of the power generating asset(s), as indicated by the operational data set, relative to the performance prediction. As such, the control action may include implementing a root-cause analysis to identify a root cause of the percentage shortfall.

In another aspect, the present disclosure is directed to a system for operating a power generating asset. The system includes at least one sensor operably coupled to the power generating asset. Additionally, the system includes a controller communicatively coupled to the sensor(s). The controller includes at least one processor configured to perform a plurality of operations. The plurality of operations may include, but are not limited to, receiving the external data set(s) and the operational data set, generating and training the plurality of production-assessment models, generating the performance predictions for the plurality of model-variable combinations, and implementing a control action based on the performance predictions as described herein. However, in additional embodiments, the plurality of operations may include any of the methods, steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
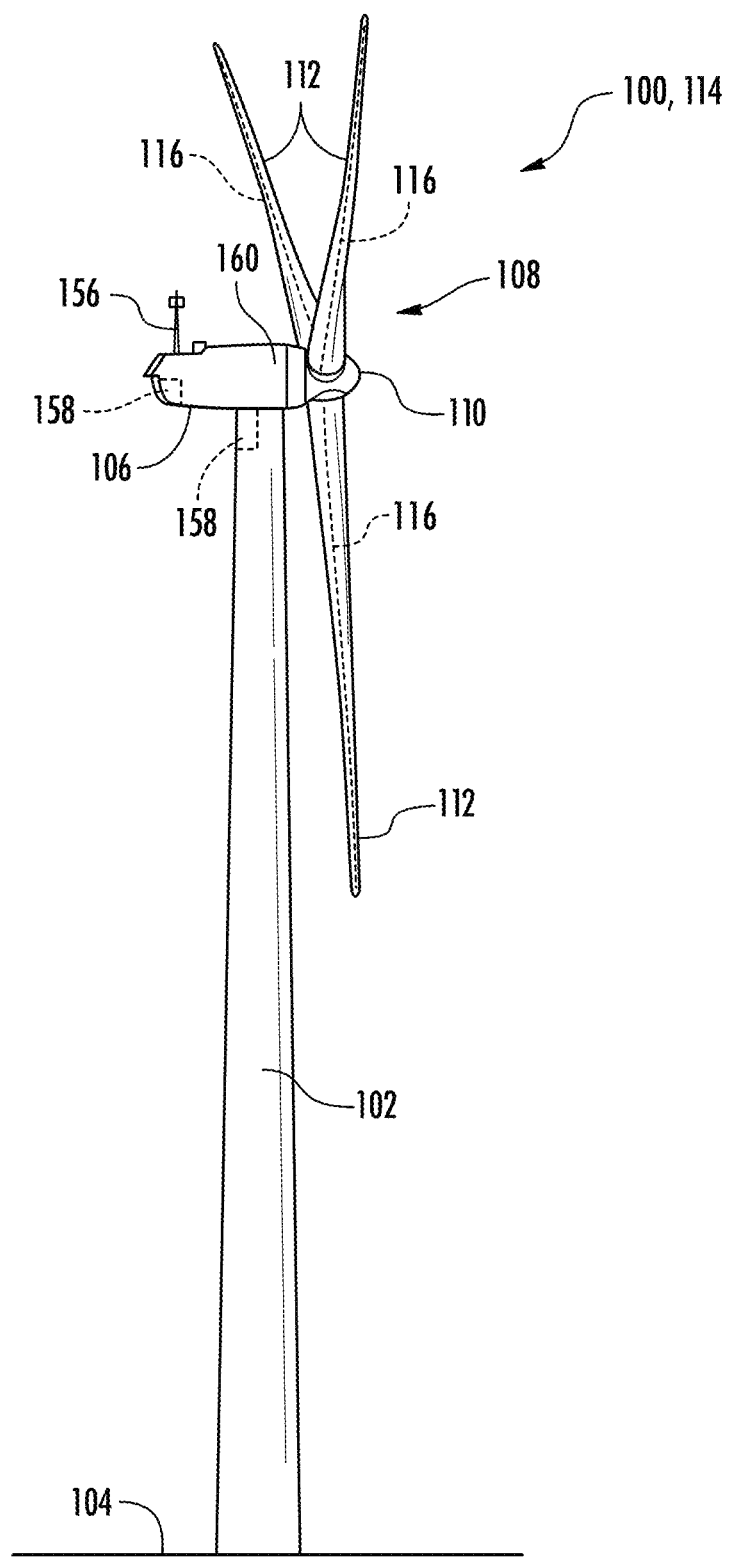
FIG. 1 illustrates a perspective view of one embodiment of a power generating asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Generally, the present disclosure is directed to a machine-learning, model-based analytics for operating a power generating asset. In particular, the present disclosure may include systems and methods which facilitate the generation of a number of different performance predictions based on multiple different model-variable combinations over a specified period. Accordingly, various machine-learning algorithms may be employed to generate a variety of different models which may emulate the performance of the power generating asset using different modeling approaches. These models may, for example, reflect linear or nonlinear relationships between the performance of the power generating asset and various variables which may affect the performance of the power generating asset. As such, the various models may generate corresponding performance predictions based on various variables, combinations of variables, and/or sampling intervals. Each performance prediction may include both a power generation prediction and a confidence interval of the prediction.

It should be appreciated that the variables described herein refer to particular sets of values corresponding to a particular factor rather than particular measurements thereof. The variables may correspond to various environmental factors such as wind speed, wind direction, wind shear, temperature, air density, humidity level, or other similar factors. As such, the models may reflect linear or nonlinear relationships between the performance of the power generating assets and the selected factor. For example, one model-variable combination may reflect the relationship between performance and wind speed, while an additional model-variable combination may reflect the relationship between performance and both the speed and direction of the wind.

By way of illustration, the systems and methods disclosed herein may generate and employ model-variable combinations A) through J) as illustrated below:

TABLE 1

| Combination (Relationship) | Samp. Int. | Variable Count |
|---|---|---|
| A (non-linear) | Hour | 2× |
| B (linear) | Hour | 2× |
| C (non-linear) | Day | 2× |
| D (linear) | Day | 2× |
| E (non-linear) | Hour | 1× |
| F (linear) | Hour | 1× |
| G (non-linear) | Day | 1× |
| H (linear) | Day | 1× |
| I (non-linear) | Month | 1× |
| J (linear) | Month | 1× |

Each of the model-variable combination A) through J) may output a different performance prediction for the power generating asset. Each of the different performance predictions may represent different expected power generation value and an expected range of deviation relative to the predicted value. For example, determining the performance prediction based on a two variable, non-linear model (e.g., combination (A)) having an hourly sampling interval may result in the expected range of deviation being relatively small. In contrast, determining the performance prediction based on a single variable, non-linear model (e.g. combination (I)) having a monthly sampling interval may result in a greater predicted performance but also in a large expected range of deviation relative to that of combination (A). As various implementation strategies may necessitate varying degrees of fidelity of the performance predictions, the model-variable combination, and corresponding performance prediction, upon which a control action is based may be selected based on certain operational considerations. In other words, the optimal model-variable combination may be different for one implementation strategy versus another implementation strategy.

It should be appreciated that the various performance predictions may be employed in a variety of applications. For example, the various performance predictions may be employed in the formation of production agreements/guarantees, such as related to power purchase agreements. When considering such an agreement, it may be desirable to select the model-variable combination for which the uncertainty surrounding the predicted power generation is the smallest relative to the remaining performance predictions, and therefore the confidence in the predicted power generation is relatively high.

As an additional example, the various performance predictions may be employed to analyze the advisability of a contemplated upgrade to the power generating asset. When employed in such a manner, it may be desirable to select the model-variable combination outputting the greatest predicted power generation magnitude with the smallest uncertainty.

By way of further example, the various model-variable combinations may be employed to analyze a number of power generating assets. The resultant performance predictions for each of the power generating assets may facilitate a rank ordering of the power generating assets. Based on the rank ordering, the power generating assets employed to meet an operational objective may be selected. Additionally, the rank ordering may illuminate performance deficiencies in certain power generating assets. As a result, a diagnostics system may be implemented to determine the root cause of the performance deficiency relative to the remaining power generating assets to facilitate correction thereof.

Additionally, the various performance predictions may be employed to determine at least one operating mode for the power generating asset. For example, the various performance predictions may be employed to determine an optimal or desired thrust limit, target rotor speed, and/or rated power.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid-power generating asset.

Figure 3:
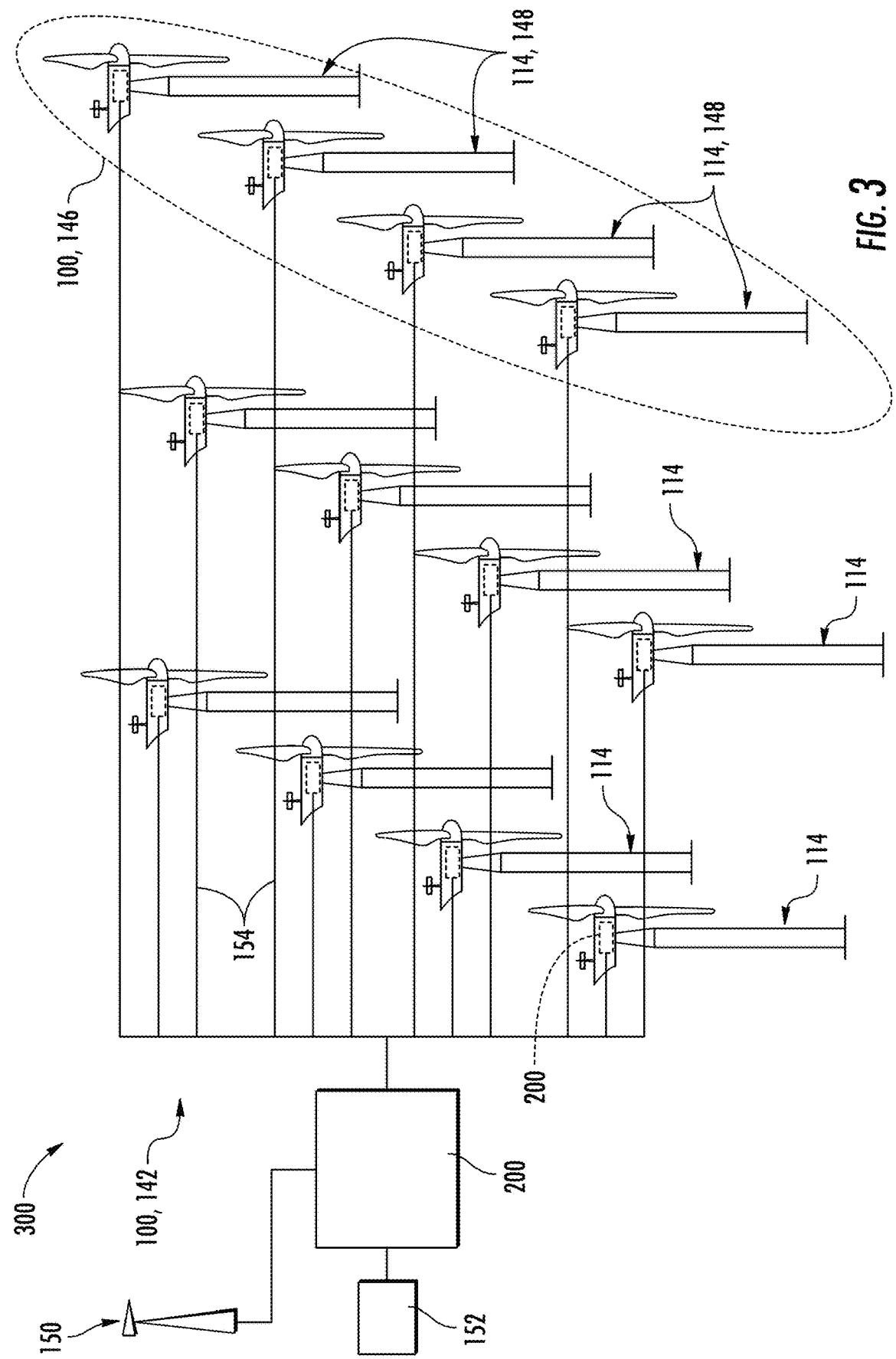
FIG. 3 illustrates a plurality of wind turbines configured as a wind farm according to the present disclosure.

In an embodiment, such as depicted in FIG. 3, the power generating asset 100 may be configured as a power generating facility 142. As illustrated in FIG. 3 the power generating facility 142 may, in an embodiment, be configured as a wind farm however, in additional embodiments, the power generating facility 142 may be configured as a solar power generation facility and/or a hybrid-power generating facility.

In an additional embodiment, the power generating asset 100 may be configured as a plurality of power generating subsystems 146. The subsystems 148 may be configured as wind turbine(s) 114, solar power generating asset(s), hydroelectric plant(s), fossil fuel generator(s), hybrid-power generating asset(s), or combination thereof.

Referring again to FIG. 1, when configured as a wind turbine 114, the power generating asset 100 may generally include a tower 102 extending from a support surface 104, a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The power generating asset 100 may also include a controller 200. When configured as a wind turbine 114, the controller 200 may be configured as a turbine controller centralized within the nacelle 106. However, in other embodiments, the controller 200 may be located within any other component of the wind turbine 100 or at a location outside the wind turbine. Further, the controller 200 may be communicatively coupled to any number of the components of the power generating asset 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
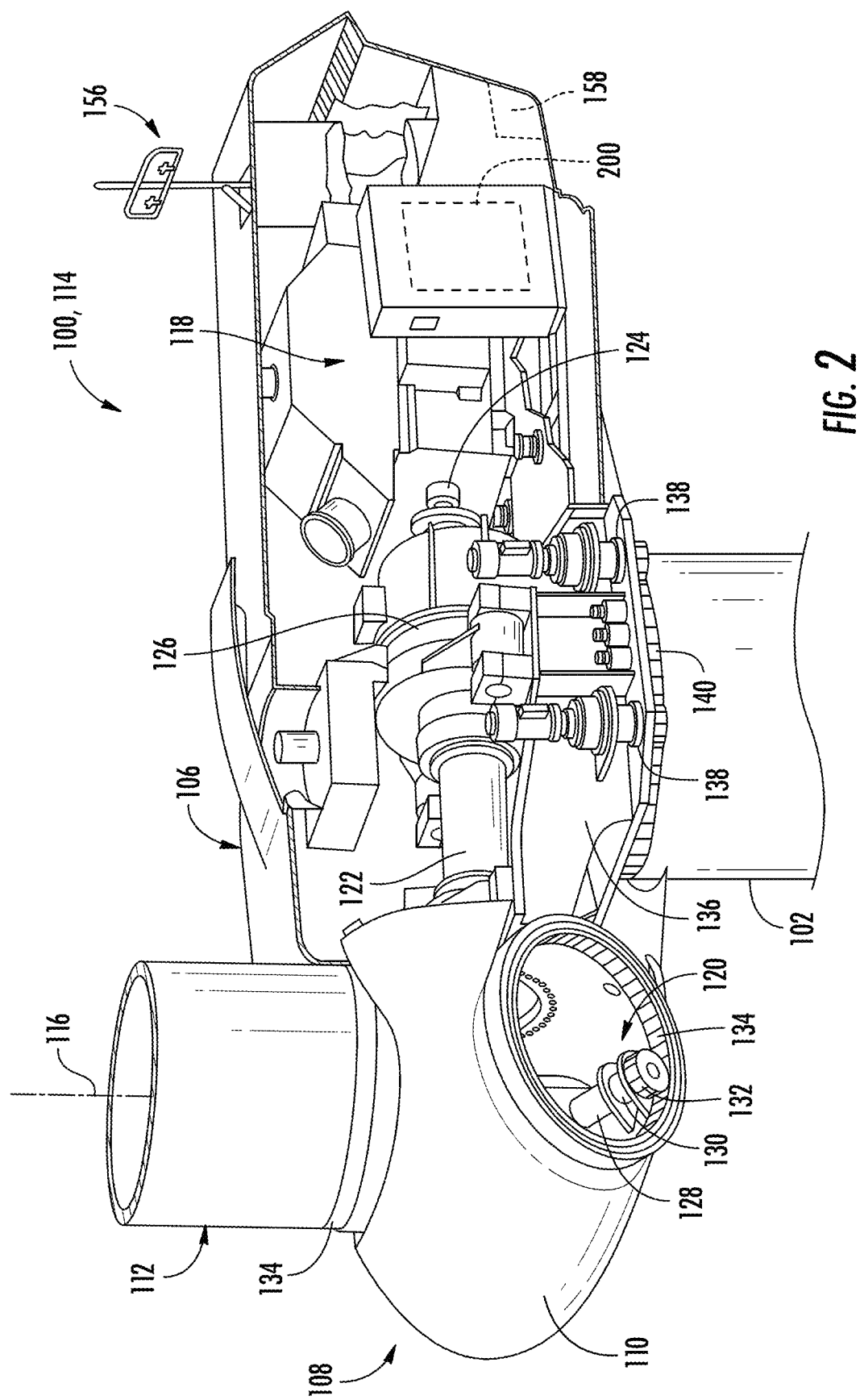
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 114 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. Each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 114 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 114). It should be appreciated that the controller 200 may direct the yawing of the nacelle 106 and/or the pitching of the rotor blades 112 so as to aerodynamically orient the wind turbine 114 relative to a wind acting on the wind turbine 114, thereby facilitating power production.

In several embodiments, the power generating asset 100 may include at least one environmental sensor 156 for monitoring at least one environmental condition affecting the power generating asset 100. In an embodiment, the environmental sensor(s) 156 may, for example, be a wind vane, an anemometer, a lidar sensor, thermometer, barometer, or any other suitable sensor. Accordingly, the environmental sensor(s) 156 may collect data indicative of wind direction, wind speed, wind shear, wind gust, wind veer, atmospheric pressure, pressure gradient and/or temperature. In at least one embodiment, the environmental sensor(s) 156 may be mounted to the nacelle 106 at a location downwind of the rotor 108.

It should be appreciated that the environmental sensor(s) 156 may include a network of sensors and may be positioned away from the power generating asset 100. For example, in an embodiment, the environmental sensor(s) 156 may be configured as a meteorological mast 150.

In addition, the power generating asset 100 may include one or more operational sensors 158. The operational sensor(s) 158 may be configured to detect a performance of the power generating asset 100 in response to the environmental condition. The operational sensor(s) 158 may be configured to monitor multiple parameters associated with the performance and/or health of a component of the power generating asset 100. For example, the operational sensor(s) 158 may monitor parameters associated with vibrations, audible signals, visual indications, angular positions, rotational velocities, bending moments, power consumption, power generation, temperature and/or other suitable parameters.

In an embodiment, the operational sensor(s) 158 may, for example, be a rotational speed sensor operably coupled to the controller 200. For example, the operational sensor(s) 158 may be directed at the rotor shaft 122 of the power generating asset 100, such as the wind turbine 114. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a direct current (DC) tachometer, an alternating current (AC) tachometer, a digital tachometer, a contact tachometer a non-contact tachometer, or a time and frequency tachometer.

Still referring to FIG. 2, in an embodiment, the operational sensor(s) 158 may be configured to collect data indicative of a response of the component(s) of the power generating asset 100 to the environmental condition(s) or other load. For example, the operational sensor(s) 158 may be configured to monitor electrical parameters of the output of the power generating asset 100. As such, the operational sensor(s) 158 may be a current sensor, voltage sensor, temperature sensors, power sensor, and/or frequency meter that monitors the electrical output of the power generating asset 100.

By way of further illustration, in an embodiment, the operational sensor(s) 158 may be configured as a strain gauge configured to detect a tensile load on the component, such as the rotor 108. In an additional embodiment, the operational sensor(s) 158 may include at least one of an accelerometer, a photo-optic sensor, an acoustic sensor, a transducer, a lidar system, a vibration sensor, a force sensor, a rate sensor, a piezo sensor, a position sensor, an inclinometer, and/or a torque sensor. In an embodiment, the operational sensor(s) 158 may, for example, be configured to collect sensor data indicative of at least one of a nacelle acceleration, a vibration of the tower 102, a bending of the rotor shaft 122, an acoustic signature of the power generating asset 100, an occlusion of an optical sensor due to a passage of the rotor blade 112, a rotor blade 112 discontinuity, a horizontal and vertical deflection of the rotor 108, and/or an acceleration of the rotor 108.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100.

Referring now to FIG. 3, wherein the power generating asset 100 is configured as a power generating facility 142 (e.g., a wind farm). As depicted, the power generating facility may include a number of power generating subsystems 148 (e.g., wind turbines 114) as described herein. For example, as shown in the illustrated embodiment, the power generating facility 142 may include twelve power generating subsystems 148. However, in other embodiments, the power generating facility 142 may include any other number of power generating subsystems 148, such as less than twelve power generating subsystems 148 or greater than twelve power generating subsystems 148. It should be appreciated that the power generating facilities 142 may be coupled to the controller 200 and/or POI 152 via communication links 154.

Figure 4:
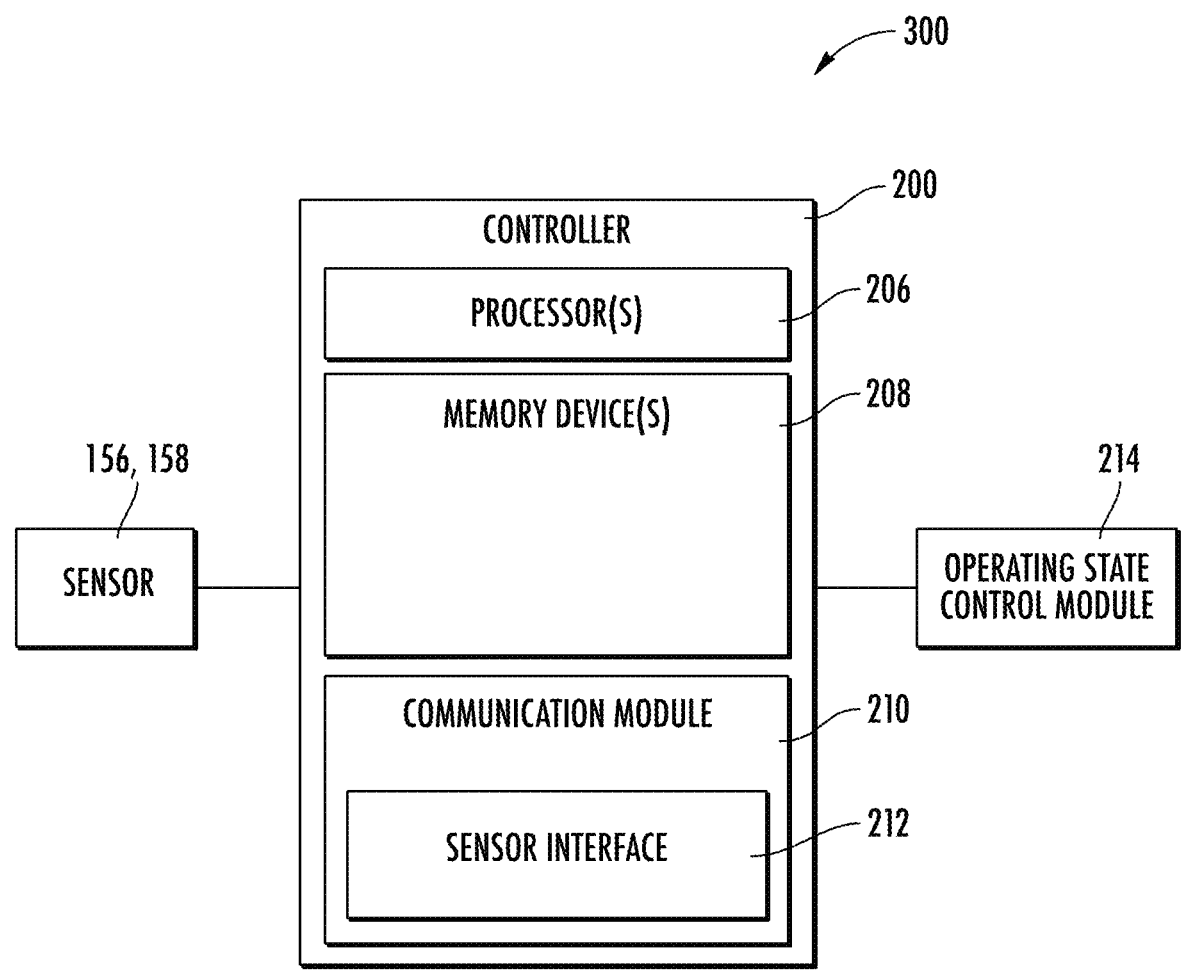
FIG. 4 illustrates a schematic diagram of one embodiment of a controller according to the present disclosure.
Figure 5:
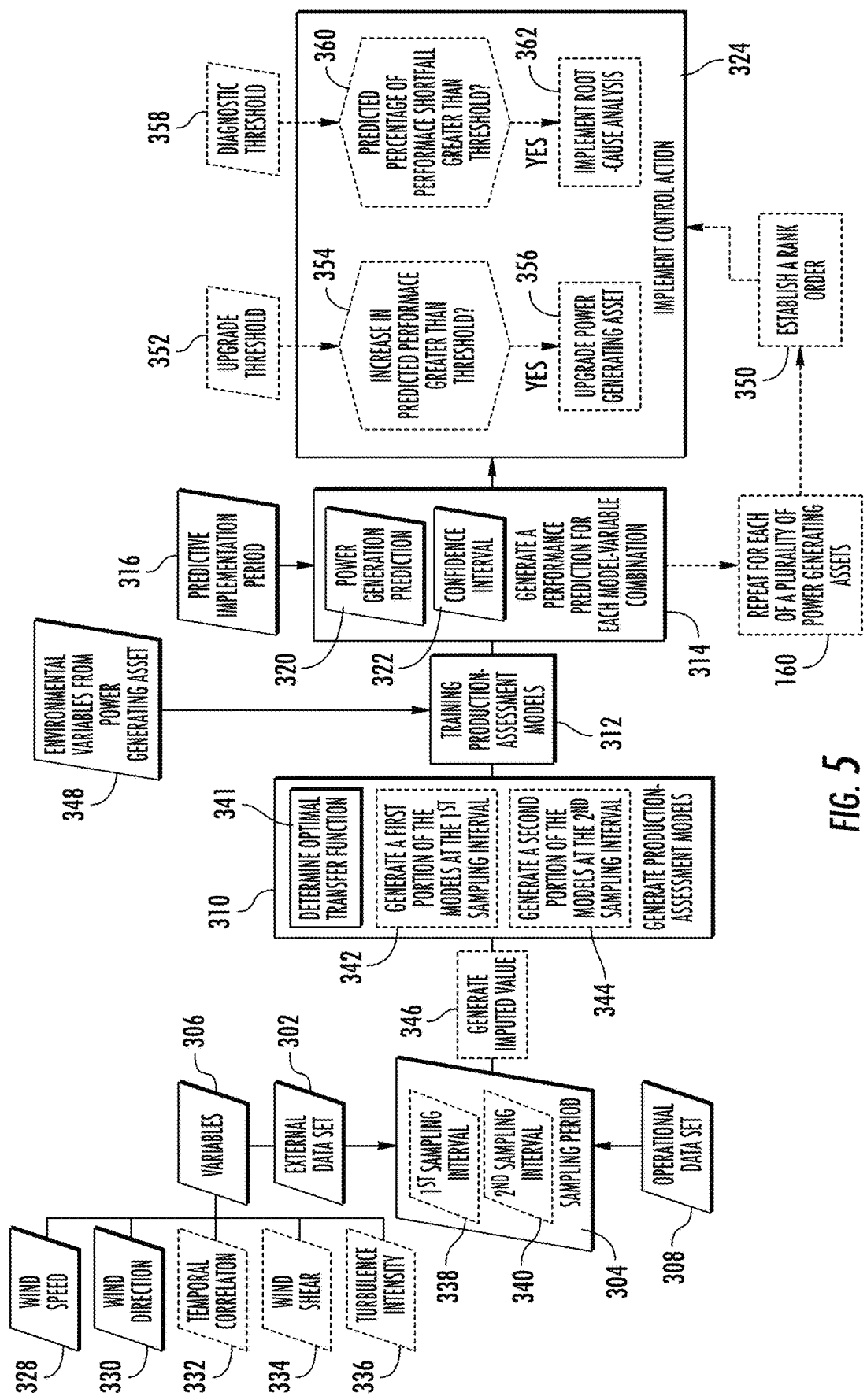
FIG. 5 illustrates a schematic diagram of one embodiment of a control logic of a system for operating a power generating asset according to the present disclosure.

Referring now to FIGS. 4-7, various aspects of multiple embodiments of a system 300 for operating the power generating asset 100 according to the present disclosure are presented. For example, as described herein, the system 300 may be utilized for operating the wind turbine 114 described above. However, it should be appreciated that the disclosed system 300 may be used for any other power generating asset 100 having any suitable configuration. In addition, although FIG. 5 depicts steps performed in a particular order for purposes of illustration and discussion, the methods and steps described herein are not limited to any particular order or arrangement. One skilled in the art using the disclosures provided herein, will appreciate that various steps of the method may be omitted, rearranged, combined and/or adapted in various ways.

As shown particularly in FIG. 4, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the power generating asset(s) 100, and components thereof. Further, the communications module 210 may include a sensor interface 212 (e.g., one or more analog-to-digital converters) to permit signals transmitted from one or more sensors, such as the environmental sensor(s) 156 and/or the operational sensor(s) 158 to be converted into signals that can be understood and processed by the processors 206. It should be appreciated that the sensors may be communicatively coupled to the communications module 210 using any suitable means. For example, as shown in FIG. 4, the sensors may be coupled to the sensor interface 212 via a wired connection. However, in other embodiments, the sensors 156, 158 may be coupled to the sensor interface 212 via a wireless connection, such as by using any suitable wireless communications protocol known in the art. Additionally, the communications module 210 may also be operably coupled to an operating state control module 214 configured to implement a control action.

In an embodiment, the controller 200 may be configured as an asset controller and may be integrated with the power generating asset 100. For example, the controller 200 may be configured as a turbine controller, a farm controller, and/or other similar controller configured to direct the operation of the power generating asset 100. In an additional embodiment, the controller 200 may include a distributed network of computing devices. In such an embodiment, one of the distributed computing devices may be integrated with the power generating asset 100 while an additional computing device may be located away from the power generating asset, such as at a design or manufacturing facility.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, generating a plurality of production-assessment models corresponding to at least one external data set and at least one operational data set, training the production-assessment models and generating a performance prediction for each of a plurality model-variable combinations in order to implement a control action as described herein, as well as various other suitable computer-implemented functions.

Figure 7:
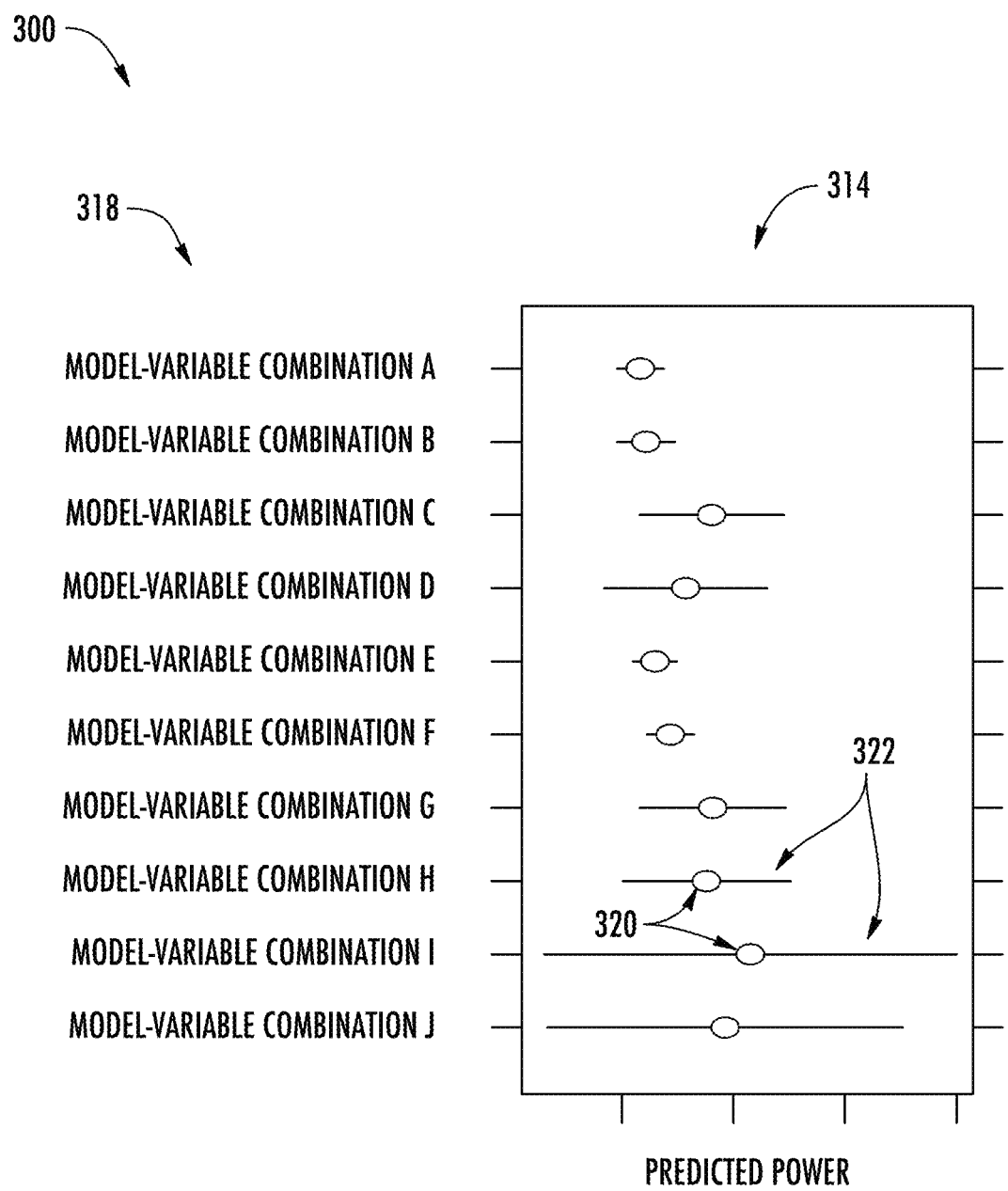
FIG. 7 illustrates a tabular representation of performance predictions for a plurality of model-variable combinations for a single power generating asset according to the present disclosure.

Referring particularly to FIG. 5, in an embodiment, the controller 200 of the system 300 may be configured to receive at least one external data set 302 for a sampling period 304 from at least one source which is separate from the power generating asset 100. The external data set(s) 302 may be indicative of a plurality of variables 306. The plurality of variables 306 may affect a performance of the power generating asset 100. The controller 200 may also be configured to receive at least one operational data set 308 for the power generating asset 100 for the sampling period 304. The operational data set 308 may be indicative of the performance of the power generating asset 100, such as in response to the variables 306. Additionally, the controller 200 may generate a plurality of production-assessment models 310 for the power generating asset 100. As depicted at 312, the controller 200 may then train (e.g. via machine learning) the plurality of production-assessment models 310 via the external and operational data sets 302, 308. Training the plurality of production-assessment models 310 may correlate the performance of the power generating asset 100 as a function of the plurality of variables 306. Once the plurality of production-assessment models 310 are trained, the controller 200 may generate a performance prediction 314 over a predictive implementation period 316 for each of a plurality of model-variable combinations 318 (FIG. 7).

The plurality of model-variable combinations 318 may include a plurality of combinations of each of the production assessment models 310 and the plurality of variables 306. The performance predictions 314 may each include a power generation prediction 320 and a confidence interval 322. Additionally, the controller 200 may implement a control action 324 based on one of the performance predictions 314.

Figure 6:
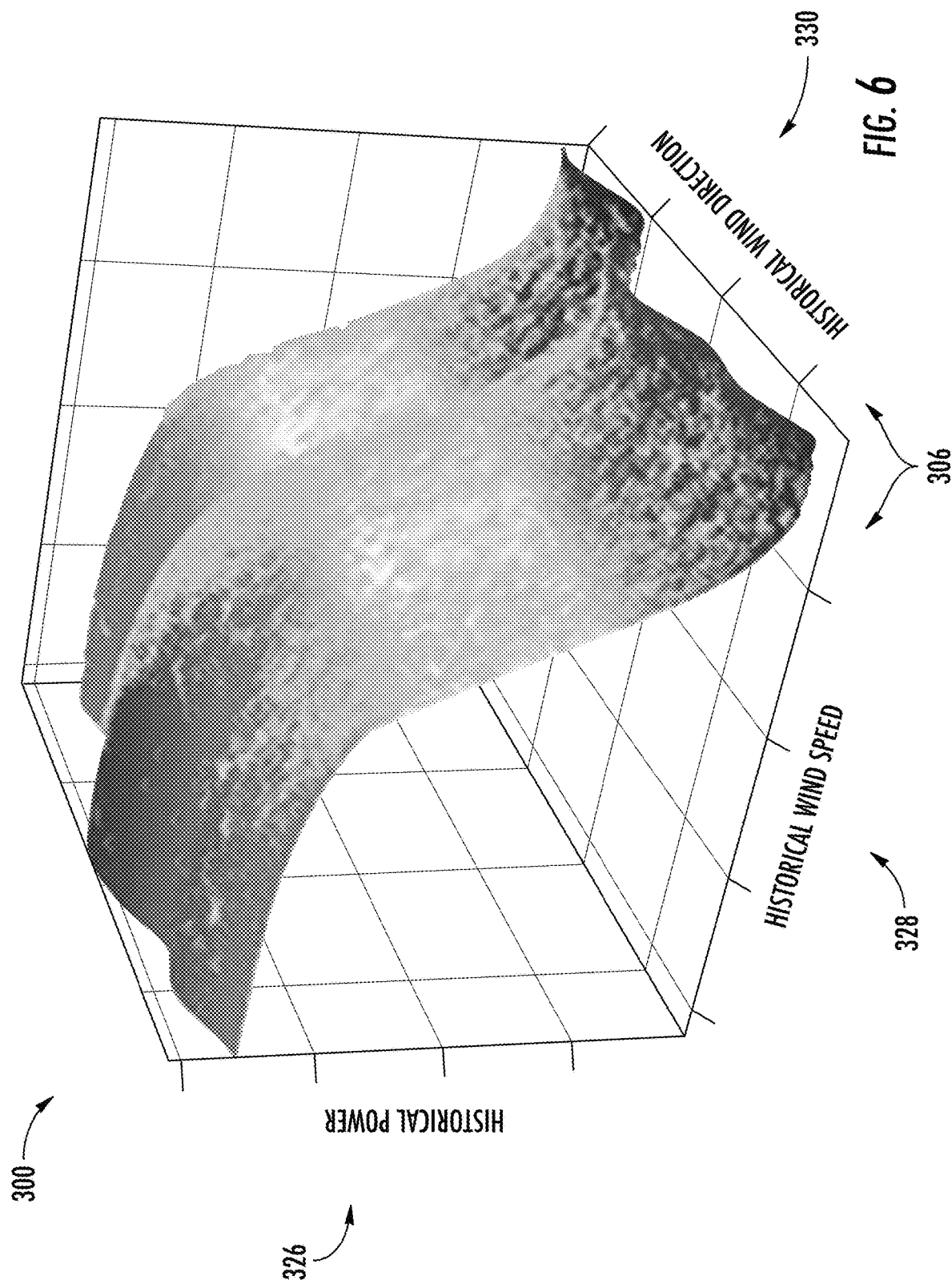
FIG. 6 illustrates a graphical representation of a relationship between an operational data set and two variables of at least one external data set according to the present disclosure.

In an embodiment, the plurality variables 306 of the external data set(s) 302 may include at least two independent variables 306. Accordingly, the performance of the power generating asset 100 (e.g. historical power production 326 (FIG. 6)) may be correlated as a function of the two independent variables 306. As depicted in FIG. 6, the correlating function between the performance of the power generating asset 100 and the two independent variables 306 may be visualized as a three-dimensional plot. As the production-assessment models 310 may be trained based on the correlation of performance (e.g. historical power production 326) to the two independent variables 306, the performance prediction 314 may, thus, be based on the projected effect of the two independent variable 306 on the projected performance of the power generating asset 100. It should be appreciated that the utilization of at least two variables 306 by the controller 200 may facilitate higher fidelity performance predictions 314 than may be obtainable utilizing only a single variable 306.

It should also be appreciated that the variables 306 refer to particular sets of values corresponding to a particular factor affecting the performance of the power generating asset 100, rather than particular measurements of the factor at a particular sampling interval. As such, each of the plurality of model-variable combinations 318 may reflect linear or nonlinear relationships between the performance of the power generating assets and the selected factor as modeled by a particular production-assessment model 310. For example, one model-variable combination 318 may reflect the relationship between performance and wind speed 328, while an additional model-variable combination 318 may reflect the relationship between performance and both the speed and direction of the wind 328, 330.

It should further be appreciated that the utilization of more than two variables 306 may further refine the correlating function, thereby increasing the fidelity of the performance prediction(s) 314. While increasing the fidelity of the performance prediction 314, the utilization of more than two variables 306 may also increase the complexity of data collection and/or analysis thereof. Accordingly, it may be desirable to balance the benefits attributable to the increase in fidelity of the performance prediction(s) 314 with the increased complexity of data collection and/or analysis thereof.

As depicted in FIG. 6, in an embodiment, the plurality of variables 306 of the external data set(s) 302 include both a wind speed 328 and a wind direction 330 affecting the performance of the power generating asset 100. The performance of the power generating asset 100 (e.g., a historical power production 326) in response to both the wind speed 328 and the wind direction 330 may, thus, be reflected by the operational data set 308. The simultaneous correlation of both wind speed 328 and wind direction 330 to the historical performance of the power generating asset 100 may facilitate higher fidelity performance predictions 314 than may be obtainable utilizing only one of the wind speed or direction 328, 330. For example, a wind turbine 114 may encounter a certain wind speed 328 from a first direction and may produce a first quantity of power. However, when the same wind speed 328 comes from a different direction, the wind turbine 114 may produce a second, lesser quantity of power. This may, for example, be attributable to a disturbed airflow (such as a wake effect), an obstruction, an operating limit, and/or other condition. Accordingly, developing the performance prediction 314 based on only one of wind speed or direction 328, 330 may reduce the accuracy of and/or confidence in the performance prediction(s) 314 relative to a performance prediction 314 based on at least wind speed 328 and wind direction 330.

In an embodiment, the plurality variables 306 may also include at least one additional variable 306 which may further define the correlation of the performance of the power generating asset 100 to the external data set(s) 302. Accordingly, in an embodiment, the plurality of variables 306 may include at least three variables 306. For example, the plurality variables 306 may include the wind speed 328, the wind direction 330, and at least one additional variable 306. In an embodiment, the additional variable 306 may be a temporal correlation 332. The temporal correlation 332 may relate the performance of the power generating asset 100 to a defined time period, such as day, night, a season, or other similar measure. For example, the temporal correlation 332 may illuminate a change in the performance of the power generating asset 100 during certain periods of the year, such as seasons during which increased wind velocities may be experienced. In additional embodiments, the additional variable(s) 306 may include a measure of wind shear 334, turbulence intensity 336 and/or measures of other variables (e.g. temperature, air pressure, air density, humidity levels, wind sheer, wind veer, turbulence intensity, etc.) which may affect the performance of the power generating asset 100.

In an embodiment, the sampling period 304 may include a plurality of sampling intervals at which the data comprising the external data set(s) 302 and/or the operational data set 308 may be collected. The sampling interval may be selected so as to develop external and/or operational data sets 302, 308 having a sufficient number of historical data points to support the training of the production-assessment models 310. The sampling intervals may, for example, be established with a monthly frequency. In an additional embodiment, each sampling intervals may correspond to 24 hours. In yet additional embodiments, the sampling interval may have a duration of less than or equal to 60 minutes (e.g., a sampling interval of 10 minutes).

Referring still to FIG. 5, in an embodiment, the external and operational data sets 302, 308 may each be generated at a first sampling interval 338 and at least at a second sampling interval 340. The second sampling interval 340 may, in an embodiment, have a higher frequency/sampling rate relative to the first sampling interval 338. For example, in an embodiment, the first sampling interval 338 may correspond to a monthly sampling interval, the second sampling interval 340 may correspond to a daily sampling interval, while a third sampling interval may correspond to an hourly sampling interval, with an external and an operational data set 302, 308 corresponding to each of the sampling intervals. In such an embodiment, the various production-assessment models 310 may be trained on the corresponding variables 306 at each of the sampling intervals (as depicted by Table 1). In other words, in an embodiment, a first portion 342 of the production-assessment models 310 may be generated based on the external data set 302 and the operational data set 308 having the first sampling interval 338. In such an embodiment, a second portion 344 of the production-assessment models 310 may be generated based on the external data set(s) 302 and the operational data set 308 having the second sampling interval 340.

It should be appreciated that the differences in the quantity of data points generated by each of the sampling intervals over the same sampling period 304 duration may result in differences in the production-assessment models 310, and therefore may result in variations in the performance predictions 314 for each model-variable combination 318.

In an embodiment, the external data set(s) 302 and/or the operational data set(s) 308 may include at least one anomalous input for a sampling interval of the sampling period 304. The anomalous input may be a quality issue with a portion of the external and/or operational data sets 302, 308. For example, the anomalous input may result from an inaccurate anemometer wind speed measurement, a curtailed operating condition of the power generating asset 100, icing of a rotor blade 112, and/or missing power production data for a sampling interval.

The impact of the anomalous input may be mitigated via the imputation of the anomalous input. Accordingly, the controller 200 may, in an embodiment, employ an imputation algorithm to generate an imputed value 346 for the anomalous input for the sampling interval. For example, in an embodiment, the controller 200 may utilize the operational data set 308 to learn the power production characteristics (e.g., a power curve) of a power generating asset 100. The controller may then utilize the learned characteristic to estimate/impute a power production value for the missing power production data.

In an embodiment, the external data set(s) 302 may include a modeled environmental data set. The modeled environmental data set may be indicative of a plurality of environmental variables which may affect the power generating asset 100. For example, the external data set(s) 302 may be developed from environmental models, such as the Modern-Era Retrospective analysis for Research and Applications, Version 2 (MERRA-2) model or other similar reanalysis approaches.

In an additional embodiment, the external data set(s) 302 may include a plurality of environmental measurements collected by at least one meteorological mast 150 (e.g., a met mast). The meteorological mast(s) 150 may be installed in the vicinity of the power generating asset 100 and may serve as a mounting location for the environmental sensor(s) 156. Accordingly, the meteorological mast(s) 150 may include an anemometer, a weathervane, a barometer, a hydrometer, a thermometer, and/or other similar meteorological instrumentation configured to collect measurements indicative of the variables 306 affecting the performance of the power generating asset 100.

In a further embodiment, the external data set(s) 302 may include an environmental data set assembled from a group of power generating subsystems 148 of the power generating asset 100. Accordingly, the controller 200 may receive an indication of each of the plurality of variables 306 from each of the power generating subsystems 148 in the group at each sampling interval of the sampling period 304. The controller may then combine the plurality of variables 306 received from each of the power generating subsystems 148 to generate a consensus environmental data set indicative of a plurality of consensus environmental variables 306 affecting the performance of the power generating asset 100. For example, in an embodiment involving a plurality of wind turbines 114, the controller 200 may receive a yaw setpoint indication from each of the wind turbines 114. As the wind turbines 114 are generally optimized to align parallel to the wind direction 330, the combined yaw setpoints of a designated group of wind turbines 114 may provide a consensus indication of the prevailing wind direction 330 affecting the power generating asset 100. The utilization of data obtained from a group of power generating subsystems 148 to determine an environmental condition affecting the power generating asset 100 is more fully described in U.S. patent application Ser. No. 17/027,789. As such, U.S. patent application Ser. No. 17/027,789 entitled "Systems and Methods for Controlling a Wind Turbine" filed Sep. 22, 2020 is incorporated herein by reference in its entirety for all purposes.

Referring still to FIG. 5, in an embodiment, the controller 200 may generate and train the plurality of production-assessment models 310 for the power generating asset 100. Generating the production-assessment models 310 may, in an embodiment, include generating a statistical algorithm or machine learning algorithm for each of the plurality of production-assessment models 310, and training the algorithms via the external and operational data sets 302, 308. Accordingly, the statistical algorithm or machine learning algorithm may be configured to determine an optimal transfer function 341 between at least two variables 306 of the plurality of variables 306 and the performance of the power generating asset 100 as reflected by the operational data set(s) 308.

For example, in an embodiment, a stepwise regression may be utilized to generate and train at least one of the production-assessment models 310. Generally, stepwise regression adds or removes features one at a time in an attempt to get the best regression model without over fitting. Further, stepwise regression typically has two variants including forward and backward regression, both of which are within the scope and spirit of the invention. For example, forward stepwise regression is a step-by-step process of building a model by successive addition of predictive variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling the response variable.

Another statistical method which may be employed in an embodiment to generate and train at least one of the production-assessment models 310 may be a least absolute shrinkage and selection operator (LASSO) algorithm. Generally, a LASSO algorithm minimizes the negative log-likelihood subject to a constraint that the sum of the absolute value of the coefficients is smaller than a constant. Still another statistical algorithm that may be employed to generate and train at least one of the production-assessment models 310 is an M5 Prime (M5P) algorithm, which is a tree-based regression algorithm that is effective in many domains. For example, whereas stepwise regression may produce a single global linear model for the data, tree-based regression algorithms may perform logical tests on features to form a tree structure. Generally, the M5P algorithm utilizes a linear regression model at each node of the tree, providing more specialized models.

In an additional embodiment, other machine learning methods which may be employed to generate and train the various production-assessment models 310 may include, for example, Gaussian Process Models, Random Forest Models, Neural Network, Deep Neural Networks and/or Support Vector Machines. Additionally, a Generalized Additive Model (GAM) may be employed by the controller 200 to develop the one or more of production-assessment models 310. In an embodiment, the GAM may implement a bagging and boosting approach. In an additional embodiment, the GAM may implement a spline method. It should be appreciated that the system 300 may employ combinations of the statistical algorithms or machine learning algorithms disclosed herein in order to determine the model-variable combination 318 which generates the most desirable performance prediction 314 for a given operating objective.

In addition to the external data set(s) 302, the controller 200 may, in an embodiment, be configured to receive a plurality of environmental variables 348 from the environmental sensor 156 of the power generating asset 100. The plurality of environmental variables 348 as monitored by the environmental sensor 156 of the power generating asset 100 may then be incorporated by the controller 200 into the training of the production-assessment models 310. It should be appreciated that the perception of the plurality of environmental variable 348 by the power generating asset 100 may affect various setpoints of the power generating asset 100, and therefore the performance of the power generating asset 100. Accordingly, the inclusion of the plurality of environmental variables 348 as monitored by the power generating asset 100 in the training of the production-assessment models 310 may facilitate the refinement of the correlating function.

In an embodiment, following the training of the production-assessment models 310, the production-assessment models 310 may be tested to determine the accuracy of the production-assessment models 310. In order to facilitate the testing, a portion of the external and operational data sets 302, 308 corresponding to a specific sampling period may be excluded from the data sets employed in the training of the production-assessment models 310. The withheld portion of the external data set(s) 302 may then be employed by the controller 200 to model the performance of the power generating asset 100 under the conditions indicated by the withheld portion. The modeled performance may then be compared to the withheld portion of the operational data set(s) 308 to determine the accuracy of the production-assessment model 310.

As depicted in FIG. 7, each of the model-variable combinations 318 may generate a different performance prediction 314 for the power generating asset 100. Each performance prediction 314 may have a difference in the power generation prediction 320 and/or the confidence interval 322. The differences in the performance predictions 314 may be attributable to modeling differences, variable selection, and/or the sampling intervals of the sampling period 304. Accordingly, an optimal model-variable combination 318 may be selected from the plurality of model-variable combinations 318 based on operational objectives and/or operational constraints of the power generating asset 100.

By way of illustration, when employing the system 300 to forecast the energy production of the power generating asset 100 in order to form an energy guarantee agreement, the optimal model-variable combination 318 may be the model-variable combination 318 having the narrowest confidence interval 322. In such an embodiment, the confidence interval 322 may indicate that a range of deviation between the power generation prediction 320 and an actual power production for the power generating asset 100 may be smaller than may be achievable using other model-variable combinations 318. In other words, the selected optimal model-variable combination 318 may indicate that the actual power production of the power generating asset may not deviate significantly from the power generation prediction 320. Thus, the power generation prediction 320 may be relied upon to form an energy guarantee agreement.

By way of further illustration, in an embodiment, the performance predictions 314 may be employed to determine whether sufficient benefit may be realized from an upgrade to the power generating asset 100 to justify a cost of the upgrade. In such an embodiment, the optimal model-variable combination 318 may be the model-variable combination 318 having the greatest power generation prediction 320 and the narrowest confidence interval 322. In other words, the optimal model-variable combination 318 may, in such an embodiment, not be the model-variable combination 318 having the greatest overall power generation prediction 320 if the prediction is accompanied by a relatively wide confidence interval 322.

Referring again to FIG. 5, in an embodiment, the controller 200 may implement at least one control action 324 based on the performance predictions 314. For example, in an embodiment, the control action(s) 324 may include generating an alert. The generation of the alert may facilitate the scheduling of a maintenance event in order to address a performance prediction 314 which is less than an expected value and/or includes a significant degree of potential variability. Accordingly, the alert may include an auditory signal, a visual signal, a notification, a system input, and/or any other system which may identify a potential for the power generating asset 100 to fail to meet a performance expectation and therefore a potential fault within the power generating asset 100. It should be appreciated that the control action(s) 324 as described herein may further include any suitable command or constraint by the controller 200. For example, in an embodiment, the control action(s) 324 may include temporarily de-rating the power generating asset 100. Additionally, in an embodiment, the control action(s) 324 may include limiting an operation of at least one component of the power generating asset 100. For example, the control action(s) 324 may limit a pitching of a rotor blade 112 and/or a yawing of the nacelle 106 of the wind turbine 114.

In an embodiment, the power generating asset may be one of a plurality of power generating assets 160. For example, in an embodiment, the power generating asset 100 may be one of several wind farms with each wind farm constituting a different power generating asset 100. In an additional embodiment, the power generating asset 100 may be a plurality of power generating subsystems 146 corresponding to a portion of a power generating facility (e.g., a wind farm) so that the power generating facility may include a number of pluralities of power generating subsystems 146 (e.g. various groupings of power generating subsystems 148).

In an embodiment wherein the power generating asset 100 is one of a plurality of power generating assets 160 the methods disclosed herein may be repeated for each power generating asset 100 of the plurality of power generating assets 160. Repeating the steps of the methods disclosed herein for each power generating asset 100 may generate performance predictions 314 for each power generating asset 100 of the plurality of power generating assets 160. The controller 200 may then, in an embodiment, establish a rank order 350 for each of the plurality of power generating assets 160 according to a desired performance prediction characteristic. The desired performance prediction characteristic may correspond to the power generation prediction 320, the confidence interval 322, or a combination thereof.

In an embodiment, the implementation of the control action(s) 324 may be based on the rank order 350. For example, the rank order 350 may indicate which power generating asset 100 of the plurality of power generating assets 160 may be most likely to satisfy a power production guarantee. Therefore, the identified power generating asset, which may be the highest ranked power generating asset, may be preferentially employed relative to the remaining plurality of power generating assets 160 in an effort to satisfy the required power production.

In an embodiment, implementing the control action(s) 324 may involve upgrading at least one portion of the plurality of power generating assets 160. As such, the production-assessment models 310 may be amended/modified to account for the proposed modifications/upgrades to the power generating asset 100. Therefore, the performance predictions 314 may reflect the expected performance of each of the plurality of power generating assets 160, should the contemplated upgrade be executed.

In an embodiment wherein the control action(s) 324 involves upgrading at least one portion of the plurality of power generating assets 160, the determination of the power generating assets 100 to be upgraded may be based, at least in part, on the rank order 350 of the performance predictions 314 reflecting the expected performances. As such, an upgrade threshold 352 may be established. The upgrade threshold 352 may correspond to a percentage increase in the performance prediction 314 relative to a current performance (e.g., power production) of the power generating asset 100 as indicated by the operational data set(s) 308. The percentage increase may be attributable to a perspective upgrade of the power generating asset 100. As depicted at 354, an increase in predicted performance which is greater than the upgrade threshold 352 may be identified. When the increase in the predicted performance is greater than the upgrade threshold 352, the corresponding power generating asset(s) 100 may, as depicted at 356, be upgraded.

In an embodiment, implementing the control action(s) 324 may include implementing a diagnostic process on at least one of the plurality of power generating assets 160. In such an embodiment, a diagnostic threshold 358 may be established. The diagnostic threshold 358 may be indicative of a percentage shortfall of the performance of the power generating asset 100 relative to performance predictions 314 for the remainder of the plurality of power generating assets 160. For example, the percentage shortfall may indicate a percentage shortfall relative to a median, or other statistical measure, of the performance predictions 314 for the plurality of power generating assets 160. Accordingly, as depicted at 360, a predicted percentage of performance shortfall greater than the threshold may be detected.

In an embodiment wherein the percentage deviation of the performance prediction 314 for a power generating asset 100 exceeds the diagnostic threshold 358, a root-cause analysis 362 may be implemented. The root-cause analysis 362 may seek to identify a root cause of the percentage shortfall. Such a root cause analysis 362 is more fully described in U.S. patent application Ser. No. 17/032,218. As such, U.S. patent application Ser. No. 17/032,218 entitled "Systems and Methods for Operating a Power Generating Asset" filed Sep. 25, 2020 is incorporated herein by reference in its entirety for all purposes.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a power generating asset, the method comprising: a) receiving, via a controller, at least one external data set for a sampling period from at least one source separate from the power generating asset, the external data set being indicative of a plurality of variables affecting a performance of the power generating asset; b) receiving, via the controller, at least one operational data set for the power generating asset for the sampling period, the at least one operational data set being indicative of the performance of the power generating asset; c) generating, via the controller, a plurality of production-assessment models for the power generating asset; d) training, via the controller, the plurality of production-assessment models via the at least one external data set and the at least one operational data set to correlate the performance of the power generating asset as a function of the plurality of variables; e) generating, via the controller, a performance prediction over a predictive implementation period for each of a plurality of model-variable combinations, wherein the plurality of model-variable combinations comprise a plurality of combinations of each of the production-assessment models and the plurality of variables, wherein the performance predictions each comprise a power generation prediction and a confidence interval; and f) implementing, via the controller, a control action based on one of the performance predictions.

Clause 2. The method of clause 1, wherein the plurality of variables comprises, at least, data indicative of wind speed and wind direction at sampling intervals of the sampling period.

Clause 3. The method of any preceding clause, wherein the plurality of variables further comprises data indicative of at least one of a temporal correlation, air temperature, air density, wind sheer, wind veer and turbulence intensity.

Clause 4. The method of any preceding clause, wherein generating the plurality of production-assessment models further comprises generating, for each of the plurality of production-assessment models, a statistical algorithm or machine learning algorithm configured to determine an optimal transfer function between at least two variables of the plurality of variables and the performance of the power generating asset.

Clause 5. The method of any preceding clause, wherein the at least one external data set and the at least on operational data set are each generated at a first sampling interval and a second sampling interval, and wherein generating the plurality of production-assessment models further comprises: generating a first portion of the plurality of production-assessment models based on the at least one external data set and the at least on operational data set having the first sampling interval; and generating a second portion of the plurality of production-assessment models based on the at least one external data set and the at least on operational data set having the second sampling interval, wherein the second sampling interval has a higher frequency relative to the first sampling interval.

Clause 6. The method of any preceding clause, wherein the at least one external data set comprises a modeled environmental data set indicative of a plurality of environmental variables affecting the power generating asset.

Clause 7. The method of any preceding clause, wherein the at least one external data set comprises an environmental data set assembled from a group of power generating subsystems, the method further comprising: receiving, via the controller, an indication of each of the plurality of variables from each of the power generating subsystems in the group at each sampling interval of the sampling period; and combining, via the controller, the plurality of variables received from each of the plurality of power generating subsystems in the group so as to generate a consensus environmental data set indicative of a plurality of consensus environmental variables affecting the performance of the power generating asset.

Clause 8. The method of any preceding clause, wherein the at least one external data set comprises a plurality of environmental measurements collected by a meteorological mast.

Clause 9. The method of any preceding clause, wherein training the plurality of production-assessment models further comprises training the plurality of production-assessment models via a plurality of environmental variables obtained via an environmental sensor of the power generating asset.

Clause 10. The method of any preceding clause, wherein at least one of the at least one external data set and the at least one operational data set further comprises at least one anomalous input for a sampling interval of the sampling period, the method further comprising: generating, via an imputation algorithm of the controller, an imputed value for the anomalous input for the sampling interval.

Clause 11. The method of any preceding clause, wherein the power generating asset comprises a wind turbine.

Clause 12. The method of any preceding clause, wherein the power generating asset comprises a plurality of power generating subsystems.

Clause 13. The method of any preceding clause, wherein the power generating asset comprises one of a wind farm, a solar power generation facility, and a hybrid power generating facility.

Clause 14. The method of any preceding clause, wherein the power generating asset is one of a plurality of power generating assets, the method further comprising: repeating steps a) through e) for each of the plurality of power generating assets; and establishing, via the controller, a rank order for each of the plurality of power generating assets according to a desired performance prediction characteristic, wherein the implementation of the control action is based on the rank order.

Clause 15. The method of any preceding clause, wherein implementing the control action comprises upgrading at least one of the plurality of power generating assets, the method further comprising: establishing an upgrade threshold corresponding to a percentage increase of the performance prediction relative to the performance of the power generating asset as indicated by the at least one operational data set, the percentage increase being attributable to a prospective upgrade of the power generating asset; and upgrading a power generating capacity of the at least one power generating asset having a percentage increase of the performance prediction which is greater than the upgrade threshold.

Clause 16. The method of any preceding clause, wherein implementing the control action comprises implementing a diagnostic process on at least one of the plurality of power generating assets, the method further comprising: establishing a diagnostic threshold indicative of a percentage shortfall of the performance of the at least one power generating asset, as indicated by the at least one operational data set, relative to performance predictions for the plurality of power generating assets; and implementing a root-cause analysis to identify a root cause of the percentage shortfall.

Clause 17. A system for operating a power generating asset, the system comprising: at least one sensor operably coupled to the power generating asset; and a controller communicatively coupled to the at least one sensor, the controller comprising at least one processor configured to perform a plurality of operations, the plurality of operations comprising: a) receiving at least one external data set for a sampling period from at least one source separate from the power generating asset, the external data set being indicative of a plurality of variables affecting a performance of the power generating asset, the plurality of variables comprising, at least, data indicative of wind speed and wind direction at sampling intervals of the sampling period, b) receiving at least one operational data set for the power generating asset for the sampling period, the at least one operational data set being indicative of the performance of the power generating asset, c) generating a plurality of production-assessment models for the power generating asset, d) training the plurality of production-assessment models via the at least one external data set and the at least one operational data set to correlate the performance of the power generating asset as a function of the plurality of variables, e) generating a performance prediction over a predictive implementation period for each of a plurality of model-variable combinations, wherein the plurality of model-variable combinations comprise a plurality of combinations of each of the production-assessment models and the plurality of variables, wherein the performance predictions each comprise a power generation prediction and a confidence interval; and f) implementing a control action based on one of the performance predictions.

Clause 18. The system of any preceding clause, wherein the plurality of variables further comprises data indicative of at least one of a temporal correlation, wind sheer, and turbulence intensity.

Clause 19. The system of any preceding clause, wherein the at least one external data set and the at least on operational data set are each generated at a first sampling interval and a second sampling interval, and wherein generating the plurality of production-assessment models further comprises: generating a first portion of the plurality of production-assessment models based on the at least one external data set and the at least on operational data set having the first sampling interval; and generating a second portion of the plurality of production-assessment models based on the at least one external data set and the at least on operational data set having the second sampling interval, wherein the second sampling interval has a higher frequency relative to the first sampling interval.

Clause 20. The system of any preceding clause, wherein implementing the control action comprises implementing a diagnostic process, the method further comprising: establishing a diagnostic threshold indicative of a percentage shortfall of the performance of the power generating asset, as indicated by the at least one operational data set, relative to the performance prediction; and implementing a root-cause analysis to identify a root cause of the percentage shortfall.

What is claimed is:

1. A method for operating a power generating asset, the method comprising:
   a) receiving, via a controller, at least one external data set for a sampling period from at least one source separate from the power generating asset, the external data set being indicative of a plurality of variables affecting a performance of the power generating asset;
   b) receiving, via the controller, at least one operational data set for the power generating asset for the sampling period, the at least one operational data set being indicative of the performance of the power generating asset, wherein the at least one external data set and the at least on operational data set are each generated at a first sampling interval and a second sampling interval, wherein the second sampling interval has a higher frequency relative to the first sampling interval;
   c) generating, via the controller, a plurality of production assessment models for the power generating asset, wherein generating the plurality of production assessment models further comprises:
      generating a first portion of the plurality of production assessment models based on the at least one external data set and the at least on operational data set having the first sampling interval; and
      generating a second portion of the plurality of production assessment models based on the at least one external data set and the at least on operational data set having the second sampling interval;
   d) training, via the controller, the plurality of production assessment models via the at least one external data set and the at least one operational data set to correlate the performance of the power generating asset as a function of the plurality of variables;
   e) generating, via the controller, a performance prediction over a predictive implementation period for each of a plurality of model variable combinations, wherein the plurality of model variable combinations comprise a plurality of combinations of each of the production assessment models and the plurality of variables, wherein the performance predictions each comprise a power generation prediction and a confidence interval; and
   f) implementing, via the controller, a control action based on one of the performance predictions.

2. The method of claim 1, wherein the plurality of variables comprises, at least, data indicative of wind speed and wind direction at sampling intervals of the sampling period.

3. The method of claim 2, wherein the plurality of variables further comprises data indicative of at least one of a temporal correlation, air temperature, air density, wind shear, wind veer and turbulence intensity.

4. The method of claim 1, wherein generating the plurality of production assessment models further comprises generating, for each of the plurality of production assessment models, a statistical algorithm or machine learning algorithm configured to determine an optimal transfer function between at least two variables of the plurality of variables and the performance of the power generating asset.

5. The method of claim 1, wherein the at least one external data set comprises a modeled environmental data set indicative of a plurality of environmental variables affecting the power generating asset.

6. The method of claim 1, wherein the at least one external data set comprises an environmental data set assembled from a group of power generating subsystems, the method further comprising:
   receiving, via the controller, an indication of each of the plurality of variables from each of the power generating subsystems in the group at each sampling interval of the sampling period; and
   combining, via the controller, the plurality of variables received from each of the power generating subsystems in the group so as to generate a consensus environmental data set indicative of a plurality of consensus environmental variables affecting the performance of the power generating asset.

7. The method of claim 1, wherein the at least one external data set comprises a plurality of environmental measurements collected by a meteorological mast.

8. The method of claim 1, wherein training the plurality of production assessment models further comprises training the plurality of production assessment models via a plurality of environmental variables obtained via an environmental sensor of the power generating asset.

9. The method of claim 1, wherein at least one of the at least one external data set and the at least one operational data set further comprises at least one anomalous input for a sampling interval of the sampling period, the method further comprising:
   generating, via an imputation algorithm of the controller, an imputed value for the anomalous input for the sampling interval.

10. The method of claim 1, wherein the power generating asset comprises a wind turbine.

11. The method of claim 1, wherein the power generating asset comprises a plurality of power generating subsystems.

12. The method of claim 1, wherein the power generating asset comprises one of a wind farm, a solar power generation facility, and a hybrid power generating facility.

13. The method of claim 1, wherein the power generating asset is one of a plurality of power generating assets, the method further comprising:
   repeating steps a) through e) for each of the plurality of power generating assets; and
   establishing, via the controller, a rank order for each of the plurality of power generating assets according to a desired performance prediction characteristic, wherein the implementation of the control action is based on the rank order.

14. The method of claim 13, wherein implementing the control action comprises upgrading at least one of the plurality of power generating assets, the method further comprising:
   establishing an upgrade threshold corresponding to a percentage increase of the performance prediction relative to the performance of the power generating asset as indicated by the at least one operational data set, the percentage increase being attributable to a prospective upgrade of the power generating asset; and upgrading a power generating capacity of the at least one power generating asset having a percentage increase of the performance prediction which is greater than the upgrade threshold.

15. The method of claim 13, wherein implementing the control action comprises implementing a diagnostic process on at least one of the plurality of power generating assets, the method further comprising:

establishing a diagnostic threshold indicative of a percentage shortfall of the performance of the at least one power generating asset, as indicated by the at least one operational data set, relative to performance predictions for the plurality of power generating assets; and implementing a root cause analysis to identify a root cause of the percentage shortfall.

16. A system for operating a power generating asset, the system comprising:

at least one sensor operably coupled to the power generating asset; and a controller communicatively coupled to the at least one sensor, the controller comprising at least one processor configured to perform a plurality of operations, the plurality of operations comprising:

a) receiving at least one external data set for a sampling period from at least one source separate from the power generating asset, the external data set being indicative of a plurality of variables affecting a performance of the power generating asset, the plurality of variables comprising, at least, data indicative of wind speed and wind direction at sampling intervals of the sampling period, a temporal correlation, wind shear, and turbulence intensity, b) receiving at least one operational data set for the power generating asset for the sampling period, the at least one operational data set being indicative of the performance of the power generating asset, c) generating a plurality of production assessment models for the power generating asset, d) training the plurality of production assessment models via the at least one external data set and the at least one operational data set to correlate the performance of the power generating asset as a function of the plurality of variables, e) generating a performance prediction over a predictive implementation period for each of a plurality of model variable combinations, wherein the plurality of model variable combinations comprise a plurality of combinations of each of the production assessment models and the plurality of variables, wherein the performance predictions each comprise a power generation prediction and a confidence interval; and f) implementing a control action based on one of the performance predictions, wherein implementing the control action comprises implementing a diagnostic process, the plurality of operations further comprising:

establishing a diagnostic threshold indicative of a percentage shortfall of the performance of the power generating asset, as indicated by the at least one operational data set, relative to the performance prediction; and implementing a root cause analysis to identify a root cause of the percentage shortfall.

17. The system of claim 16, wherein the at least one external data set and the at least on operational data set are each generated at a first sampling interval and a second sampling interval, and wherein generating the plurality of production assessment models further comprises:

generating a first portion of the plurality of production assessment models based on the at least one external data set and the at least on operational data set having the first sampling interval; and generating a second portion of the plurality of production assessment models based on the at least one external data set and the at least on operational data set having the second sampling interval, wherein the second sampling interval has a higher frequency relative to the first sampling interval.

* * * * *